(12) United States Patent
McClelland

(10) Patent No.: US 12,520,742 B2
(45) Date of Patent: Jan. 13, 2026

(54) CONDITION VERIFICATION SYSTEM FOR AN AGRICULTURAL SYSTEM

(71) Applicant: CNH Industrial America LLC, New Holland, PA (US)

(72) Inventor: Brett Carson McClelland, Chicago, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 931 days.

(21) Appl. No.: 17/717,924

(22) Filed: Apr. 11, 2022

(65) Prior Publication Data

US 2023/0320251 A1    Oct. 12, 2023

(51) Int. Cl.
*A01B 79/00* (2006.01)
*A01B 69/04* (2006.01)
*A01F 15/08* (2006.01)

(52) U.S. Cl.
CPC .......... *A01B 79/005* (2013.01); *A01B 69/008* (2013.01); *A01F 15/08* (2013.01)

(58) Field of Classification Search
None
See application file for complete search history.

(56) References Cited

U.S. PATENT DOCUMENTS

| 8,838,322 B1 | 9/2014 | Zhu et al. |
| 9,086,699 B2 | 7/2015 | Pirotais |
| 9,188,980 B2 | 11/2015 | Anderson |
| 9,420,203 B2 | 8/2016 | Broggi et al. |
| 9,902,425 B2 | 2/2018 | Singh et al. |
| 9,939,817 B1 | 4/2018 | Kentley-Klay et al. |
| 2014/0277965 A1 | 9/2014 | Miller et al. |
| 2015/0081156 A1 | 3/2015 | Trepagnier et al. |
| 2016/0029543 A1* | 2/2016 | Stich ............. A01B 63/112 701/50 |
| 2016/0153778 A1 | 6/2016 | Singh et al. |

(Continued)

FOREIGN PATENT DOCUMENTS

| WO | 2017079349 | 5/2017 |
| WO | 2020023269 | 1/2020 |

OTHER PUBLICATIONS

Murray, Farming's "Killer App", Reed Business Information, Feb. 4, 2008, 4 pgs, vol. 63, Issue 2, http://dialog.proquest.com/professional/docview/1085249088?accountid=157282.

(Continued)

*Primary Examiner* — Tamara L Weber
(74) *Attorney, Agent, or Firm* — Fletcher Yoder, P.C.

(57) ABSTRACT

A condition verification system for an agricultural system includes a sensor configured to output a sensor signal indicative of a position of a ground engaging tool of the agricultural system relative to soil. The condition verification system also includes a controller having a memory and a processor, in which the controller is communicatively coupled to the sensor. The controller is configured to receive the sensor signal from the sensor, determine whether the ground engaging tool is engaged with the soil based on the position of the ground engaging tool, and terminate or block initiation of at least one control action of a speed control system of the agricultural system and/or a steering control system of the agricultural system in response to determining the ground engaging tool is engaged with the soil.

20 Claims, 4 Drawing Sheets

(56) References Cited

U.S. PATENT DOCUMENTS

| | | | |
|---|---|---|---|
| 2017/0241184 A1 | 8/2017 | Rust | |
| 2020/0100419 A1* | 4/2020 | Stanhope | A01B 19/10 |
| 2020/0107490 A1* | 4/2020 | Zemenchik | A01B 63/111 |
| 2020/0337199 A1* | 10/2020 | Hertzog | A01B 3/34 |
| 2021/0333802 A1 | 10/2021 | Singh et al. | |
| 2024/0328435 A1* | 10/2024 | Hiemer | F15B 21/00 |

OTHER PUBLICATIONS

Chen et al., "Design of a Multi-Sensor Cooperation Travel Environment Perception System for Autonomous Vehicle", MDPI, Sep. 12, 2012, 19 pgs, https://www.mdpi.com/1424-8220/12/9/12386.

* cited by examiner

CONDITION VERIFICATION SYSTEM FOR AN AGRICULTURAL SYSTEM

BACKGROUND

The present disclosure relates generally to a condition verification system for an agricultural system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Certain agricultural implements include ground engaging tools configured to interact with soil. For example, a tillage implement may include tillage points and/or disc blades configured to break up the soil for subsequent planting or seeding operations. In addition, a planting or seeding implement may include openers (e.g., disc blades and/or shanks) configured to form trenches/furrows within the soil to facilitate deposition of agricultural product (e.g., seed, fertilizer, etc.) beneath the soil surface. The planting or seeding implement may also include closing discs to close the trenches/furrows and/or press wheels to pack soil on top of the deposited agricultural product (e.g., to promote seed germination and/or to increased yield).

Prior to initiating certain actions, the ground engaging tools of the agricultural implement are raised. For example, the ground engaging tools may be raised prior to turning at a headland, prior to transporting the agricultural implement across a road, and prior to performing a shuttle shift. The operator may manually raise the ground engaging tools prior to initiating the action, or the ground engaging tools may be raised by an automated system prior to initiating the action. Raising the ground engaging tools before initiating the action may increase the longevity of the ground engaging tools and/or may reduce the draft load on a work vehicle towing the agricultural implement.

BRIEF DESCRIPTION

In certain embodiments, a condition verification system for an agricultural system includes a sensor configured to output a sensor signal indicative of a position of a ground engaging tool of the agricultural system relative to soil. The condition verification system also includes a controller having a memory and a processor, in which the controller is communicatively coupled to the sensor. The controller is configured to receive the sensor signal from the sensor, determine whether the ground engaging tool is engaged with the soil based on the position of the ground engaging tool, and terminate or block initiation of at least one control action of a speed control system of the agricultural system and/or a steering control system of the agricultural system in response to determining the ground engaging tool is engaged with the soil.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
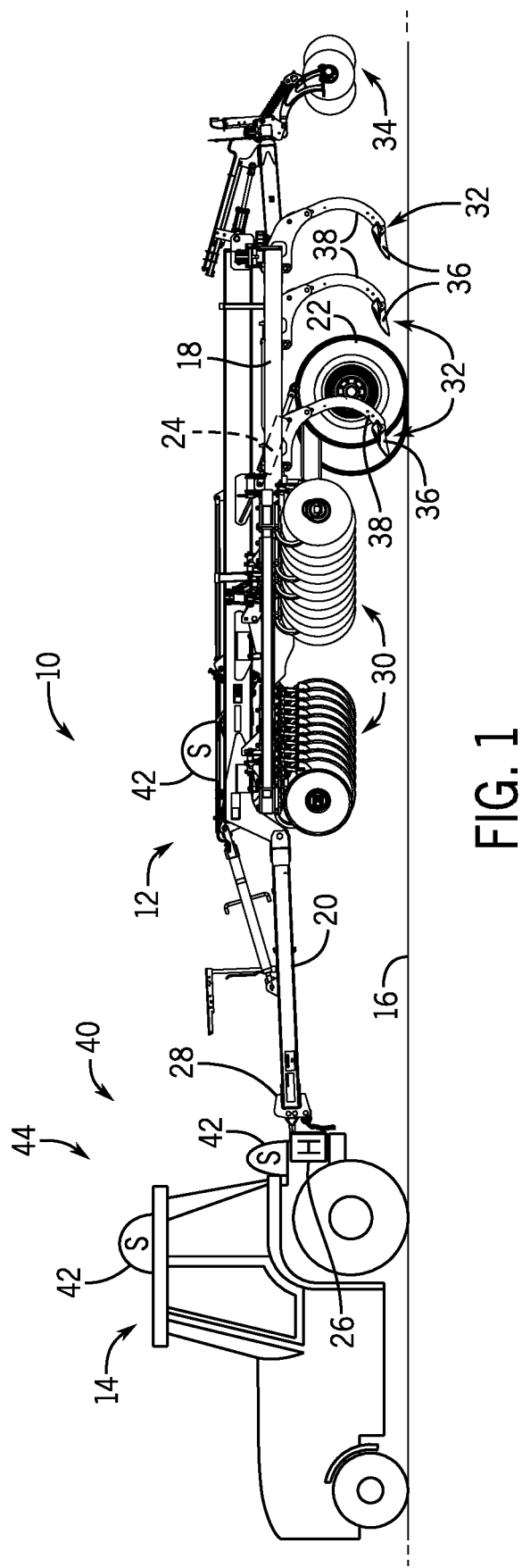
FIG. 1 is a side view of an embodiment of an agricultural system having an embodiment of an agricultural implement and an embodiment of a work vehicle.

FIG. 1 is a side view of an embodiment of an agricultural system 10 having an embodiment of an agricultural implement 12 and an embodiment of a work vehicle 14. In the illustrated embodiment, the agricultural implement 12 is a primary tillage implement having multiple ground engaging tools configured to till the soil 16. As illustrated, the agricultural implement 12 includes a frame 18 and a hitch assembly 20 coupled to the frame 18. The hitch assembly 20 is configured to couple to the work vehicle 14 (e.g., tractor), and the work vehicle 14 is configured to tow the agricultural implement 12 through a field.

In the illustrated embodiment, the agricultural implement 12 includes wheels 22 configured to engage the surface of the soil 16 and to support at least a portion of the agricultural implement 12. In addition, the agricultural implement 12 includes an actuator 24 configured to move the wheels 22 relative to the frame 18 from the illustrated lowered position to a raised position. While the wheels 22 are in the illustrated lowered position, the ground engaging tools of the agricultural implement 12 are disengaged from the soil 16, such that the ground engaging tools are in a ground-disengaged position (e.g., to facilitate transport and/or inspection of the agricultural implement 12, to enabled the agricultural system 10 to perform a headland turn, etc.). The actuator 24 may lift the wheels 22 to the raised position, thereby causing the ground engaging tools to engage the soil 16, such that the ground engaging tools are in a ground-engaged position. Once the ground engaging tools are engaged with the soil 16, the work vehicle 14 may tow the agricultural implement 12 throughout a field to perform a tillage operation. The actuator 24 may include an electromechanical actuator, a hydraulic actuator, a pneumatic actuator, or another suitable type of actuator. While the agricultural implement 12 includes a single actuator 24 in the illustrated embodiment, in other embodiments, the agricultural implement may include multiple actuators (e.g., 2, 3, 4, or more) to control the position of the wheels relative to the frame of the agricultural implement.

In the illustrated embodiment, the work vehicle 14 includes a hitch actuation system 26 configured to control a position of a hitch 28 of the hitch assembly 20, thereby controlling the position of the ground engaging tools relative to the soil 16. While the hitch 28 is in a raised position, as illustrated, the ground engaging tools of the agricultural implement 12 are disengaged from the soil 16, such that the ground engaging tools are in the ground-disengaged position (e.g., to facilitate transport and/or inspection of the agricultural implement 12, to enabled the agricultural system 10 to perform a headland turn, etc.). The hitch actuation system 26 may lower the hitch 28 to a lowered position, thereby causing the ground engaging tools to engage the soil 16, such that the ground engaging tools are in the ground-engaged position. As previously discussed, once the ground engaging tools are engaged with the soil 16, the work vehicle 14 may tow the agricultural implement 12 throughout the field to perform the tillage operation. The hitch actuation system 26 may include any suitable actuator(s) and structure(s) to raise and lower the hitch 28, such as three-point hitch links, a linkage assembly, one or more supports, one or more hydraulic actuators, one or more pneumatic actuators, one or more electromechanical actuators, other suitable component(s), or a combination thereof. While the position of the ground engaging tools relative to the soil 16 is controlled by the hitch actuation system 26 and the wheel actuator(s) 24 in the illustrated embodiment, in other embodiments, the position of the ground engaging tools relative to the soil may be controlled by the hitch actuation system alone or the wheel actuator(s) alone. Furthermore, in certain embodiments, the position of the ground engaging tools relative to the soil may be controlled by other suitable device(s)/system(s) (e.g., alone or in combination with the hitch actuation system and/or the wheel actuator(s)), such as actuator(s) for individual ground engaging tool(s), actuator(s) for movable frame section(s) of the agricultural implement, other suitable actuator(s), or a combination thereof.

In the illustrated embodiment, the ground engaging tools of the agricultural implement 12 include disc blades 30, tillage point assemblies 32, and finishing discs 34. The disc blades 30 are configured to engage a top layer of the soil 16. As the agricultural implement 12 is towed through the field, the disc blades 30 are driven to rotate, thereby breaking up the top layer of the soil 16. In the illustrated embodiment, the disc blades 30 are arranged in two rows. However, in other embodiments, the disc blades may be arranged in more or fewer rows (e.g., 1, 3, 4, 5, 6, or more). In addition, the angle of each row may be selected to control the interaction of the disc blades 30 with the top layer of the soil 16. The tillage point assemblies 32 are configured to engage the soil 16 at a greater depth, thereby breaking up a lower layer of the soil 16. In the illustrated embodiment, each tillage point assembly 32 includes a tillage point 36 and a shank 38. The shank 38 is configured to position the tillage point 36 at a target depth beneath the soil surface, and the tillage point 36 is configured to break up the soil 16. The shape of each tillage point 36, the arrangement of the tillage point assemblies 32, and the number of the tillage point assemblies 32 may be selected to control tillage within the field. Furthermore, as the agricultural implement 12 is towed through the field, the finishing discs 34 are driven to rotate, thereby sizing soil clods, leveling the soil surface, smoothing the soil surface, and/or cutting residue on the soil surface.

While the agricultural implement 12 includes disc blades 30, tillage point assemblies 32, and finishing discs 34 in the illustrated embodiment, in other embodiments, the agricultural implement may include other/additional ground engaging tool(s). For example, in certain embodiments, the disc blades, the tillage point assemblies, the finishing discs, or a combination thereof, may be omitted. Furthermore, in certain embodiments, the ground engaging tools of the agricultural implement may include plow(s), harrow(s), fertilizer spreader(s), tine(s), other suitable ground engaging tool(s), or a combination thereof.

In the illustrated embodiment, the agricultural system 10 includes a condition verification system 40 configured to control operation of the agricultural system 10. The condition verification system 40 includes one or more sensors 42, and each sensor is configured to output a sensor signal indicative of position(s) of component(s) of the agricultural system 10. In addition, as discussed in detail below, the condition verification system 40 includes a controller communicatively coupled to the sensor(s) 42. The controller is configured to receive the sensor signal from each sensor and to determine whether the component(s) of the agricultural system 10 are in target position(s) based on the sensor signal(s). Furthermore, the controller is configured to terminate or block initiation of at least one control action in response to determining the component(s) are not in the target position(s). Accordingly, the possibility of initiating or continuing control action(s) while the component(s) are not in the target position(s) is substantially reduced or eliminated.

For example, in certain embodiments, at least one sensor 42 is configured to output a sensor signal indicative of a position of a ground engaging tool of the agricultural system relative to the soil 16. In such embodiments, the controller is configured to receive the sensor signal and to determine whether the ground engaging tool is engaged with the soil based on the position of the ground engaging tool. In addition, the controller is configured to terminate or block initiation of at least one control action of a speed control system and/or a steering control system of the agricultural system 10 in response to determining the ground engaging tool is engaged with the soil. The ground engaging tool may include a disc blade 30, a tillage point assembly 32, a finishing reel 34, or another suitable ground engaging tool.

In certain embodiments, the speed control system is configured to perform a rearward movement action (e.g., to position the agricultural system in a desired location, as part of a shuttle shift operation, etc.), and the control action(s) include the rearward movement action. In such embodiments, rearward movement of the agricultural system 10 may be terminated or initiation of rearward movement of the agricultural system 10 may be blocked in response to determining the ground engaging tool is engaged with the soil. As a result, the possibility a moving the ground engaging tool through the soil in a rearward direction is substantially reduced or eliminated. Furthermore, in certain embodiments, the speed control system is configured to perform a parking brake engagement action, and the control action(s) include the parking brake engagement action. In such embodiments, engagement of the parking brake may be terminated or initiation of the parking brake engagement may be blocked in response to determining the ground engaging tool is engaged with the soil. As a result, the possibility of moving the ground engaging tool through the soil in a rearward direction (e.g., due to slight rearward movement of the agricultural system down a hill while the agricultural system is parked) is substantially reduced or eliminated. Furthermore, in certain embodiments, the steering control system is configured to perform a headland turn action, and the control action(s) include the headland turn action. In such embodiments, turning at a headland may be terminated or initiation of a headland turn may be blocked in response to determining the ground engaging tool is engaged with the soil. As a result, the possibility of moving the ground engaging tool through the soil along a tightly curved path may be substantially reduced or eliminated.

In certain embodiments, the sensor(s) 42 may be part of a perception sensor system 44. Each sensor of the perception sensor system 44 is configured to output a sensor signal indicative of positions of objects within a field of view of the sensor. The controller is configured to receive the sensor signal(s) from the sensor(s) 42 of the perception sensor system 44 and to control movement of the agricultural system 10 through the field based on feedback from the sensor(s). In addition, as previously discussed, the controller is configured to determine whether component(s) of the agricultural system are in target position(s) (e.g., in ground-disengaged position(s), etc.) based on the sensor signal(s). The controller is also configured to terminate or block initiation of control action(s) in response to determining the component(s) are not in the target position. As used herein with regard to objects in the agricultural field and components of the agricultural system, "position" refers to a location and/or an orientation/angle of the respective object/component.

In certain embodiments, the sensor(s) 42 are configured to monitor a position of the hitch 28 of the hitch assembly 20. The controller may determine whether the ground engaging tool(s) are engaged with the soil based on the position of the hitch 28. As previously discussed, in certain embodiments, the hitch actuation system 26 of the work vehicle 14 is configured to control the position of the hitch 28 to control the position(s) of the ground engaging tool(s) relative to the soil 16 (e.g., alone or in combination with the wheel actuator(s) 24). The hitch actuation system 26 may raise the hitch 28 to drive the ground engaging tool(s) to the ground-disengaged position(s), as illustrated, and the hitch actuation system 26 may lower the hitch 28 to drive the ground engaging tool(s) to the ground-engaged position(s). Accordingly, the position of the hitch 28 is indicative of the position(s) of the ground engaging tool(s) of the agricultural implement. As such, at least one sensor 42 may monitor the position of the hitch 28 to enable the controller to determine whether the ground engaging tool(s) are engaged with the soil.

The sensor(s) 42 of the condition verification system 40 (e.g., of the perception sensor system 44 of the condition verification system 40) may include any suitable type(s) of sensor(s). For example, in certain embodiments, at least one sensor 42 may include a light detection and ranging (LIDAR) sensor. LIDAR sensors are configured to emit light, receive reflections of the emitted light, and determine a point cloud corresponding to objects within the field of view of the sensor based on the received reflections. Furthermore, in certain embodiments, at least one sensor 42 may include a radio detection and ranging (RADAR) sensor. RADAR sensors are configured to emit radio frequency signals, receive reflections of the radio frequency signals, and determine locations of objects within the field of view of the sensor based on the received reflections. In addition, in certain embodiments, at least one sensor 42 may include a camera configured to observe the locations of objects within the field of view of the sensor. In certain embodiments, at least one sensor 42 may include an infrared (IR) camera, an ultrasonic sensor, a capacitance sensor, an acoustic sensor, a magnetic field sensor, other suitable type(s) of sensor(s), or a combination thereof. In certain embodiments, the objects monitored by the sensor(s) 42 may include the hitch 28, the disc blade(s) 30, the tillage point assembly/assemblies 32, the finishing disc(s) 34, other ground engaging tool(s) of the agricultural implement, other component(s) of the agricultural system, obstacle(s) within the agricultural field, other suitable object(s), or a combination thereof.

The sensor(s) 42 may be located at any suitable position(s) within the agricultural system 10. For example, in certain embodiments, at least one sensor 42 may be coupled to the work vehicle 14. In such embodiments, one or more sensors 42 may be located at a rear portion of the work vehicle 14, such that the hitch 28 is positioned within the field of view of the sensor(s). In certain embodiments, the sensor(s) 42 located at the rear portion of the work vehicle 14 may be part of the perception sensor system 44, and the controller may control movement of the agricultural system 10 based on feedback from the sensor(s) 42. Furthermore, in certain embodiments, at least one sensor 42 may be coupled to the agricultural implement 12. For example, one or more sensors 42 may be located on the agricultural implement 12, such that at least one ground engaging tool is positioned within the field of view of the sensor(s). In certain embodiments, the sensor(s) located on the agricultural implement may be part of the perception sensor system, and the controller may control movement of the agricultural system based on feedback from the sensor(s).

While monitoring the position of the hitch 28 to determine whether the ground engaging tool(s) are engaged with the soil is disclosed above, in certain embodiments, the sensor(s) 42 may be configured to monitor other element(s) (e.g., alone or in combination with the hitch 28) to facilitate determination of whether the ground engaging tool(s) are engaged with the soil. For example, in certain embodiments, the sensor(s) are configured to monitor a position of the wheels 22 relative to the frame 18 of the agricultural implement 12. As previously discussed, in certain embodiments, the wheel actuator(s) 24 are configured to control the position of the wheels 22 relative to the frame 18 to control the position(s) of the ground engaging tool(s) relative to the soil 16 (e.g., alone or in combination with the hitch actuation system 26). The wheel actuator(s) 24 may lower the wheels 22 to drive the ground engaging tool(s) to the ground-disengaged position(s), as illustrated, and the wheel actuator(s) 24 may raise the wheels 22 to drive the ground engaging tool(s) to the ground-engaged position(s). Accordingly, the position of the wheels 22 is indicative of the position(s) of the ground engaging tool(s) of the agricultural implement. As such, at least one sensor 42 may monitor the position of the wheels 22 to enable the controller to determine whether the ground engaging tool(s) are engaged with the soil.

In certain embodiments, the controller may receive sensor signal(s) from the sensor(s) 42 indicative of both the position of the hitch 28 and the position of the wheels 22, and the controller may determine whether the ground engaging tool(s) are engaged with the soil based on the position of the hitch 28 and the position of the wheels 22. Furthermore, in certain embodiments (e.g., in embodiments in which the position(s) of the ground engaging tool(s) are controlled by the hitch position alone), the controller may receive sensor signal(s) from the sensor(s) 42 indicative of the position of the hitch 28, and the controller may determine whether the ground engaging tool(s) are engaged with the soil based on the position of the hitch alone. In addition, in certain embodiments (e.g., in embodiments, in which the position(s) of the ground engaging tool(s) are controlled by the wheel position alone), the controller may receive sensor signal(s) from the sensor(s) 42 indicative of the position of the wheels 22, and the controller may determine whether the ground engaging tool(s) are engaged with the soil based on the position of the wheels alone.

While determining whether the ground engaging tool(s) are engaged with the soil based on the positions of the hitch 28 and/or the wheels 22 is disclosed above, in certain embodiments, the controller may determine whether the ground engaging tool(s) are engaged with the soil based on direct monitoring of the position(s) of the ground engaging tool(s). In certain embodiments, at least one sensor 42 may be configured to directly monitor the position(s) of the ground engaging tool(s) relative to the soil 16. For example, one or more LIDAR sensors, one or more RADAR sensors, one or more cameras, one or more other suitable type(s) of sensor(s), or a combination thereof, may directly monitor the position(s) of the ground engaging tool(s) relative to the soil and output sensor signal(s) indicative of the position(s) of the ground engaging tool(s) relative to the soil. The controller may receive the sensor signal(s) and determine whether the ground engaging tool(s) are engaged with the soil based on the position(s) of the ground engaging tool(s).

As previously discussed, in certain embodiments, the sensor(s) 42 configured to monitor the position(s) of the component(s) of the agricultural system 10 are part of the perception sensor system 44. However, in certain embodiments, at least one sensor configured to monitor the position(s) of one or more components may be separate from the perception sensor system. For example, at least one sensor may be configured to only monitor the position(s) of one or more ground engaging tool(s) relative to the soil. Furthermore, as previously discussed, the controller is configured to terminate or block initiation of at least one control action (e.g., of the speed control system and/or the steering control system, etc.) in response to determining the component(s) (e.g., ground engaging tool(s), etc.) are not in the target position(s) (e.g., not in the ground-disengaged position).

Furthermore, while the sensor(s) 42 of the perception sensor system 44 are disclosed above as monitoring the position(s) of the ground engaging tool(s), in certain embodiments, the sensor(s) of the perception sensor system 44 may be configured to monitor the position(s) of other component(s) of the agricultural system. In addition, while the agricultural implement 12 is a primary tillage implement in the illustrated embodiment, in other embodiments, the agricultural implement may be another suitable type of tillage implement (e.g., vertical tillage implement, etc.), a seeding implement, a planting implement, a baling implement, a harvesting implement, or another suitable type of implement. Furthermore, while the agricultural system 10 includes a work vehicle 14 coupled to an agricultural implement 12 in the illustrated embodiment, in other embodiments, the agricultural system may include more or fewer vehicle(s)/implement(s). For example, the agricultural system may include a single self-propelled implement (e.g., harvester, baler, seeder, planter, tiller, etc.), or the agricultural system may include a work vehicle (e.g., tractor) coupled to an air cart and to a seeding or planting implement. By way of example, in certain embodiments, the agricultural system may include a baler/baling implement. In such embodiments, the component of the agricultural system monitored by the sensor(s) may include a baler door, and the target position of the baler door may be a closed position. In addition, the control action may include a movement action of the agricultural system and/or a baling performance action. Accordingly, in response to determining the baler door is not in the closed position, the controller may terminate or block initiation of the movement action and/or the baling performance action. By way of further example, in certain embodiments, the agricultural system may include a harvester, and the component of the agricultural system monitored by the sensor(s) may include a header. In such embodiments, the target position of the header may be a ground-disengaged position, and the control action may include a rearward movement action of the agricultural system and/or a harvesting performance action. Accordingly, in response to determining the header is not in a ground-disengaged position, the controller may terminate or block initiation of the rearward movement action and/or the harvesting performance action.

Figure 2:
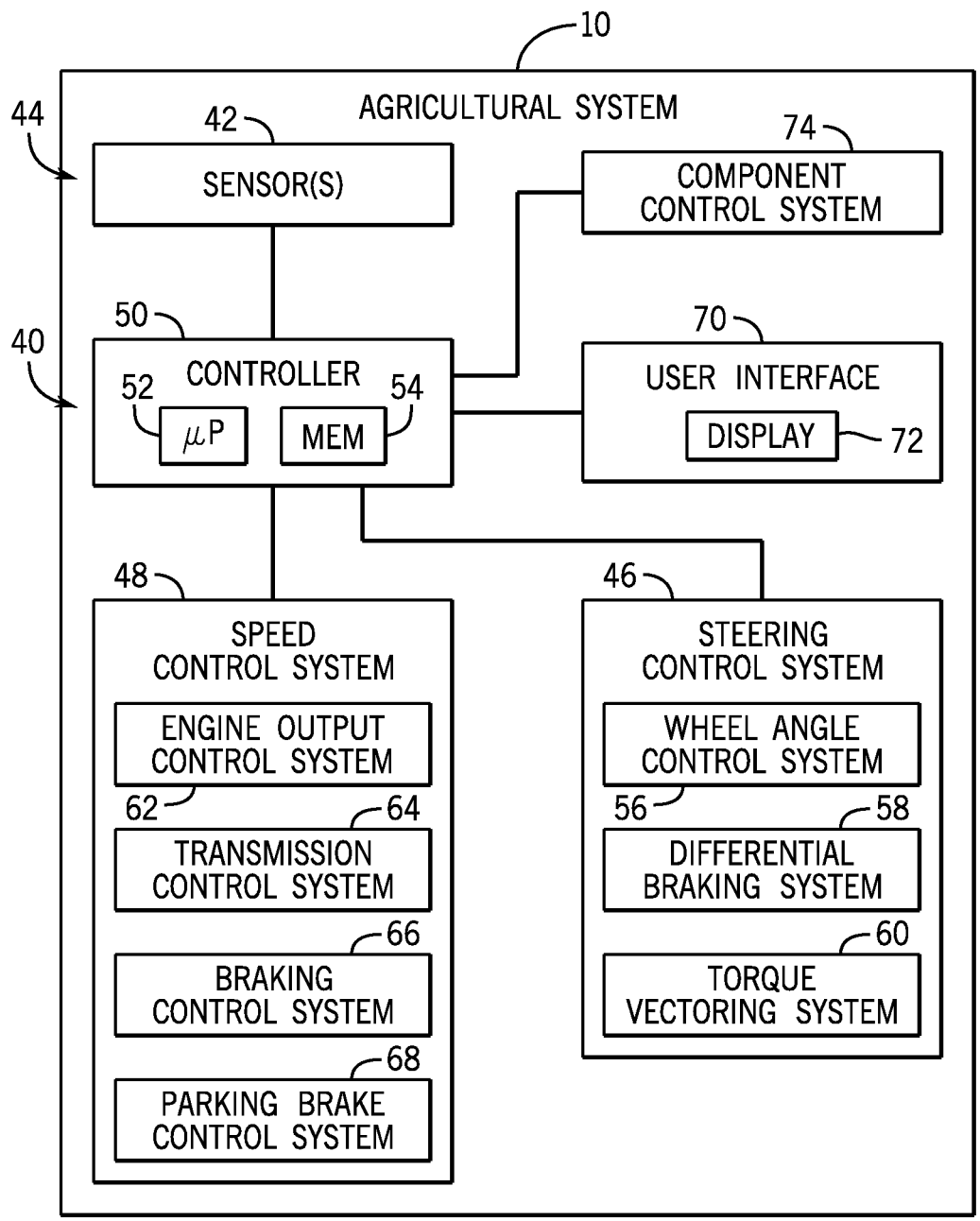
FIG. 2 is a block diagram of an embodiment of a condition verification system that may be employed within the agricultural system of FIG. 1.

FIG. 2 is a block diagram of an embodiment of a condition verification system 40 that may be employed within the agricultural system 10 of FIG. 1. As previously discussed, the condition verification system 40 is configured to control operation of the agricultural system 10. In addition, the condition verification system 40 includes one or more sensors 42, and each sensor is configured to output a sensor signal indicative of position(s) of component(s) of the agricultural system 10.

In the illustrated embodiment, the agricultural system 10 (e.g., the work vehicle of the agricultural system 10, etc.) includes a steering control system 46 configured to control a direction of movement of the agricultural system 10, and the agricultural system 10 (e.g., the work vehicle of the agricultural system 10, etc.) includes a speed control system 48 configured to control a speed of the agricultural system 10. In addition, the condition verification system 40 of the agricultural system 10 includes a controller 50 communicatively coupled to the sensor(s) 42, to the steering control system 46, and to the speed control system 48. The controller 50 is configured to receive the sensor signal from each sensor and to determine whether the component(s) of the agricultural system 10 are in target position(s) based on the sensor signal(s). Furthermore, the controller is configured to terminate or block initiation of at least one control action in response to determining the component(s) are not in the target position(s). Accordingly, the possibility of initiating or continuing control action(s) while the component(s) are not in the target position(s) is substantially reduced or eliminated.

In certain embodiments, the controller 50 is an electronic controller having electrical circuitry configured to process data from the sensor(s) 42 and to control the agricultural system 10. In the illustrated embodiment, the controller 50 includes a processor 52, such as the illustrated microprocessor, and a memory device 54. The controller 50 may also include one or more storage devices and/or other suitable components. The processor 52 may be used to execute software, such as software for controlling the agricultural system 10, and so forth. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

The memory device 54 may include a volatile memory, such as random access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 52 to execute, such as instructions for controlling the agricultural system 10. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the agricultural system, etc.), and any other suitable data. Furthermore, the controller may be a single device positioned at any suitable location within the agricultural system or remote from the agricultural system. Alternatively, the controller may include multiple control devices positioned within the agricultural system and/or remote from the agricultural system.

In the illustrated embodiment, the steering control system 46 includes a wheel angle control system 56, a differential braking system 58, and a torque vectoring system 60. The wheel angle control system 56 may rotate one or more wheels and/or tracks of the agricultural system 10 (e.g., the work vehicle of the agricultural system 10, etc.) to steer the agricultural system along a route. By way of example, the wheel angle control system 56 may rotate front wheels/tracks, rear wheels/tracks, intermediate wheels/tracks, or a combination thereof, of the agricultural system 10 (e.g., either individually or in groups). The differential braking system 58 may independently vary the braking force on each lateral side of the agricultural system 10 (e.g., the work vehicle of the agricultural system 10, etc.) to direct the agricultural system 10 along a route. In addition, the torque vectoring system 60 may differentially apply torque from an engine to wheel(s) and/or track(s) on each lateral side of the agricultural system 10 (e.g., the work vehicle of the agricultural system 10, etc.), thereby directing the agricultural system along a route. While the steering control system 46 includes the wheel angle control system 56, the differential braking system 58, and the torque vectoring system 60 in the illustrated embodiment, in other embodiments, the steering control system may include one or two of these systems in any suitable combination. Furthermore, in certain embodiments, the steering control system may include other suitable system(s) (e.g., alone or in combination with the system(s) disclosed above) to facilitate directing the agricultural system along a route, such as an articulating steering system in which a front portion of the work vehicle articulates relative to a rear portion of the work vehicle.

In the illustrated embodiment, the speed control system 48 includes an engine output control system 62, a transmission control system 64, a braking control system 66, and a parking brake control system 68. The engine output control system 62 is configured to vary the output of an engine (e.g., of the work vehicle, etc.) to control the speed of the agricultural system. For example, the engine output control system 62 may vary a throttle setting of the engine, a fuel/air mixture of the engine, a timing of the engine, other suitable engine parameters, or a combination thereof, to control engine output. In addition, the transmission control system 64 may adjust a gear ratio within a transmission (e.g., of the work vehicle, etc.) to control the speed of the agricultural system. For example, the transmission control system 64 may adjust the gear ratio by adjusting gear selection in a transmission with discrete gears, or the transmission control system 64 may adjust the gear ratio by controlling a continuously variable transmission (CVT). Furthermore, the braking control system 66 may adjust braking force (e.g., by controlling brakes on the work vehicle and/or the agricultural implement, etc.), thereby controlling the speed of the agricultural system 10. In addition, the parking brake control system 68 may selectively engage and disengage a parking brake of the agricultural system 10 (e.g., a parking brake of the work vehicle and/or a parking brake of the agricultural implement, etc.). While the speed control system 48 includes the engine output control system 62, the transmission control system 64, the braking control system 66, and the parking brake control system 68 in the illustrated embodiment, in other embodiments, the speed control system may include one or two of these systems in any suitable combination. Furthermore, in certain embodiments, the speed control system may include other suitable system(s) (e.g., alone or in combination with the system(s) disclosed above) to facilitate adjusting the speed of the agricultural system 10, such as an electric motor controller for an electric motor.

In the illustrated embodiment, the agricultural system 10 (e.g., the work vehicle of the agricultural system 10, etc.) includes a user interface 70 communicatively coupled to the controller 50. The user interface 70 is configured to receive input from an operator and to provide information to the operator. The user interface 70 may include any suitable input device(s) for receiving input, such as a keyboard, a mouse, button(s), switch(es), knob(s), other suitable input device(s), or a combination thereof. In addition, the user interface 70 may include any suitable output device(s) for presenting information to the operator, such as speaker(s), indicator light(s), other suitable output device(s), or a combination thereof. In the illustrated embodiment, the user interface includes a display 72 configured to present visual information to the operator. In certain embodiments, the display 72 may include a touch screen interface configured to receive input from the operator. While the user interface 70 includes a display 72 in the illustrated embodiment, in other embodiments, the display may be omitted.

In certain embodiments, the agricultural system 10 is manually controlled. In such embodiments, the operator may manually control operation of the agricultural system 10 via the user interface 70. Furthermore, in certain embodiments, the agricultural system 10 may be autonomously controlled or partially autonomously controlled via the controller 50. In such embodiments, the controller 50 may automatically control the speed control system 48 and the steering control system 46 to direct the agricultural system 10 along a target route through an agricultural field. In embodiments in which the agricultural system 10 is autonomously or partially autonomously controlled, the user interface 70 may enable manual control of the agricultural system, and the controller 50 may automatically disengage automatic control of the agricultural system 10 in response to receiving a manual control input from the user interface 70.

As previously discussed, in certain embodiments, the sensor(s) 42 may be part of a perception sensor system 44. In such embodiments, each sensor of the perception sensor system 44 is configured to output a sensor signal indicative of positions of objects within a field of view of the sensor. The controller 50 is configured to receive the sensor signal(s) from the sensor(s) 42 of the perception sensor system 44 and to control the speed control system 48 and the steering control system 46 based on the sensor signal(s) to direct the agricultural system 10 through the agricultural field. For example, in certain embodiments, the controller 50 may be configured to detect obstacles within the agricultural field based on feedback from the sensor(s) 42 of the perception sensor system 44. The controller 50 may then control the speed control system 48 and/or the steering control system 46 to direct the agricultural system 10 around an obstacle in the path of the agricultural system 10 or stop the agricultural system 10 before encountering the obstacle.

In addition, as previously discussed, the controller 50 is configured to determine whether component(s) of the agricultural system are in target position(s) (e.g., in ground-disengaged position(s), etc.) based on the sensor signal(s) from the sensor(s) 42 of the perception sensor system 44. The controller 50 is also configured to terminate or block initiation of control action(s) in response to determining the component(s) are not in the target position(s). As previously discussed, in certain embodiments, the sensor(s) 42 configured to monitor the position(s) of the component(s) of the agricultural system 10 are part of the perception sensor system 44. However, in other embodiments, at least one sensor configured to monitor the position(s) of one or more components may be separate from the perception sensor system. For example, in certain embodiments, the perception sensor system may be omitted.

As previously discussed, the sensor(s) 42 of the condition verification system 40 (e.g., of the perception sensor system 44 of the condition verification system 40) may include any suitable type(s) of sensor(s), such as LIDAR sensor(s), RADAR sensor(s), camera(s), IR camera(s), ultrasonic sensor(s), capacitance sensor(s), acoustic sensor(s), magnetic field sensor(s), other suitable type(s) of sensor(s), or a combination thereof. In certain embodiments, the controller 50 is configured to combine data from multiple sensors to establish aggregate or composite data. For example, the controller 50 may aggregate multiple camera images to establish a composite image that may include component(s) of the agricultural system and, in certain embodiments, obstacle(s) within the agricultural field. The composite image may enable the controller 50 to determine more accurate position(s) of the component(s)/obstacle(s), as compared to an image from a single camera. In addition, the controller 50 may combine data from multiple LIDAR sensors, multiple RADAR sensors, multiple ultrasonic sensors, or any other suitable type of sensor. The controller 50 may also combine data from sensors of multiple types to establish the aggregate or composite data. For example, the controller 50 may combine data from any combination of one or more LIDAR sensors, one or more cameras, one or more RADAR sensors, one or more ultrasonic sensors, and one or more other suitable type(s) of sensor(s) to establish the aggregate or composite data.

As previously discussed, in certain embodiments, the sensor(s) 42 configured to monitor the position(s) of the component(s) of the agricultural system 10 (e.g., ground engaging tool(s) of the agricultural system 10, etc.) may be separate from/independent of the perception sensor system (e.g., in embodiments in which the perception sensor system is omitted). In such embodiments, the sensor(s) 42 may include sensor(s) configured to directly monitor the position(s) of the agricultural system component(s) (e.g., ground engaging tool(s), etc.). For example, the sensor(s) may include potentiometer(s), capacitance sensor(s), soil detection sensor(s) (e.g., electrostatic sensor(s), radio frequency sensor(s), etc.), other suitable type(s) of sensor(s), or a combination thereof. By way of example, in certain embodiments, a monitored component of the agricultural system may include a ground engaging tool (e.g., disc blade, tillage point assembly, finishing disc, etc.), and the target position may be a ground-disengaged position. The sensor(s) 42 may include a soil sensor coupled to the ground engaging tool. While the ground engaging tool is in the ground-engaged position, the soil sensor may output a sensor signal indicative of soil presence, and while the ground engaging tool is in the ground-disengaged position, the soil sensor may output a sensor signal indicative of soil absence. The controller 50 may determine whether the ground engaging tool is engaged with the soil based on soil presence/absence, which is indicative of the position of the ground engaging tool relative to the soil. By way of further example, the ground engaging tool may be transitioned between the ground-engaged position and the ground-disengaged position via an actuator configured to move the ground engaging tool relative to a frame of the agricultural system (e.g., the frame of the agricultural implement). The sensor(s) 42 may include a potentiometer positioned between the frame and the ground engaging tool. The potentiometer may output a sensor signal indicative of the position of the ground engaging tool relative to the frame, which may be indicative of the position of the ground engaging tool relative to the soil. The controller 50 may determine whether the ground engaging tool is engaged with the soil based on the position of the ground engaging tool relative to the soil. As previously discussed, in certain embodiments, the controller 50 is configured to combine data from multiple sensors to establish aggregate or composite data. In certain embodiments, the multiple sensors may include one or more sensor(s) configured to directly monitor the position(s) of the component(s) (e.g., ground engaging tool(s), etc.).

In embodiments in which the agricultural system 10 is autonomously controlled or partially autonomously controlled, the controller 50 may terminate or block initiation of at least one autonomous control action in response to determining the component(s) (e.g., ground engaging tool(s), etc.) are not in the target position(s) (e.g., ground-disengaged position(s), etc.). For example, the controller 50 may automatically control the speed control system 48 and/or the steering control system 46 to direct the agricultural system 10 along a target route through an agricultural field based on a plan. In addition, the controller 50 may control the position(s) of the component(s) based on the plan. For example, the controller 50 may control a component control system 74, which may include one or more actuators and/or one or more actuation systems, to move certain component(s) to target position(s). In addition, the controller 50 may block initiation of at least one control action in response to determining the component(s) are not in the target position(s). By way of example, the controller 50 may control the component control system 74 (e.g., the wheel actuator(s) and/or the hitch actuation system disclosed above) to raise ground engaging tool(s) to ground-disengaged position(s) before instructing the speed control system 48 to perform a rearward movement action. The controller 50 may block initiation of the rearward movement action in response to determining the ground engaging tool(s) are in the ground-engaged position(s). Furthermore, in certain embodiments, the controller 50 may terminate a rearward movement action in response to determining the ground engaging tool(s) are in the ground engaged position(s) (e.g., if the ground engaging tool(s) move to the ground-engaged position(s) after the rearward movement action is initiated).

In embodiments in which the agricultural system 10 is manually controlled, the controller 50 may terminate or block initiation of at least one manual control action in response to determining the component(s) (e.g., ground engaging tool(s), etc.) are not in the target position(s) (e.g., ground-engaged position(s), etc.). For example, an operator may manually control the component control system 74 (e.g., via the user interface 70) to move certain component(s) to target position(s). In addition, the controller 50 may block initiation of at least one control action in response to determining the component(s) are not in the target position(s). By way of example, the operator may control the component control system 74 (e.g., the wheel actuator(s) and/or the hitch actuation system disclosed above) to raise ground engaging tool(s) to ground-disengaged position(s) before manually instructing the speed control system 48 to perform a rearward movement action. The controller 50 may block initiation of the rearward movement action in response to determining the ground engaging tool(s) are in the ground-engaged position(s). Furthermore, in certain embodiments, the controller 50 may terminate a rearward movement action in response to determining the ground engaging tool(s) are in the ground engaged position(s) (e.g., if the ground engaging tool(s) move to the ground-engaged position(s) after the rearward movement action is initiated).

In embodiments in which the controller determines whether multiple components are in multiple target positions, the controller may terminate or block initiation of at least one control action in response to determining any component is not in the respective target position. Furthermore, in certain embodiments, the controller may terminate or block initiation of certain control action(s) in response to determining certain component(s) are not in the respective target position(s), and the controller may terminate or block initiation of other control action(s) in response to determining other component(s) are not in the respective target position(s). In addition, in certain embodiments, the controller may only terminate or block initiation of at least one control action in response to determining all of the components are not in the target positions. As used herein, "terminate or block initiation of" at least one control action/control action(s) includes terminating a single control action, terminating multiple control actions, blocking initiation of a single control action, blocking initiation of multiple control actions, or a combination thereof.

In certain embodiments, the controller 50 is configured to output an information signal to the user interface 70 indicative of the component(s) (e.g., ground engaging tool(s), etc.) not being in the target position(s) (e.g., ground-disengaged position(s), etc.). In addition, the user interface 70 is configured to inform the operator that the component(s) are not in the target position(s) in response to receiving the information signal. For example, the user interface 70 may present a visual indication of the component(s) not being in the target position(s) on the display 72. Informing the operator that the component(s) are not in the target position(s) may enable the operator to determine why initiation of the control action(s) is blocked or the control action(s) are terminated.

In certain embodiments, the controller 50 may determine the target position(s) of the component(s) based on the type(s) of component(s) and/or the type(s) of agricultural implement(s) within the agricultural system. For example, if the monitored component(s) include ground engaging tool(s), the controller may determine the target position of each ground engaging tool is the ground-disengaged position. Furthermore, if the monitored component(s) include a baler door, the controller may determine the target position is a closed position.

Figure 3:
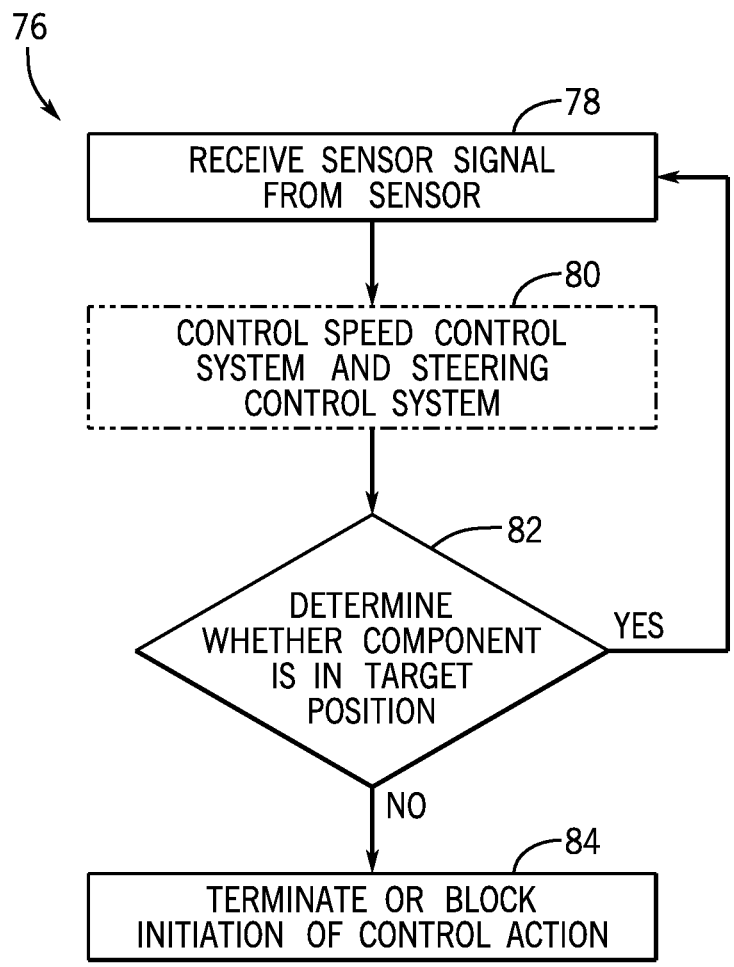
FIG. 3 is a flow diagram of an embodiment of a method that may be performed by the condition verification system of FIG. 2.

FIG. 3 is a flow diagram of an embodiment of a method 76 that may be performed by the condition verification system of FIG. 2. The method 76 may be performed by the controller disclosed above with referenced to FIG. 2 or any other suitable controller(s). Furthermore, the steps of the method 76 may be performed in the order disclosed herein or in any other suitable order. For example, certain steps of the method may be performed concurrently. In addition, in certain embodiments, at least one of the steps of the method 76 may be omitted.

First, as represented by block 78, a sensor signal is received from a sensor. The sensor signal is indicative of a position of a component of the agricultural system. In certain embodiments, the component may include a ground engaging tool, and the position may be relative to soil. Furthermore, in certain embodiments, the sensor may be part of a perception sensor system. In such embodiments, the sensor is configured to output a sensor signal indicative of positions of objects, including the component of the agricultural system, within a field of view of the sensor.

In embodiments in which the sensor is part of the perception sensor system, a speed control system of the agricultural system and a steering control system of the agricultural system are controlled based on the sensor signal to direct the agricultural system through a field (e.g., agricultural field), as represented by block 80. For example, in certain embodiments, obstacles within the field may be detected based on feedback from the sensor signal. The speed control system and/or the steering control system may then be controlled to direct the agricultural system around an obstacle in the path of the agricultural system or stop the agricultural system before encountering the obstacle.

Next, as represented by block 82, a determination is made regarding whether the component (e.g., ground engaging tool, etc.) of the agricultural system is in a target position (e.g., ground-disengaged position, etc.) based on the sensor signal. For example, in certain embodiments, the component of the agricultural system may include a ground engaging tool (e.g., disc blade, tillage point assembly, finishing disc, etc.), and the target position may be a ground-disengaged position. In such embodiments, a determination may be made regarding whether the ground engaging tool is engaged with the soil. Furthermore, in certain embodiments, the component may include a baler door, and the target position may be a closed position. In such embodiments, a determination may be made regarding whether the baler door is in the closed position.

In response to determining the component (e.g., ground engaging tool, etc.) of the agricultural system is not in the target position (e.g., ground-disengaged position, etc.), at least one control action is terminated and/or initiation of at least one control action is blocked, as represented by block 84. For example, if the component includes a ground engaging tool, at least one control action of the speed control system and/or the steering control system may be terminated and/or initiation of at least one control action of the speed control system and/or the steering control system may be blocked in response to determining the ground engaging tool is engaged with the soil. By way of further example, if the component includes a baler door, at least one control action may be terminated and/or initiation of at least one control action may be blocked in response to determining the baler door is not in the closed position. As previously discussed, in certain embodiments (e.g., in embodiments in which the component includes a ground engaging tool), the control action(s) may include a rearward movement action, a parking brake engagement action, a headland turn action, or a combination thereof. Furthermore, in certain embodiments (e.g., in embodiments in which the component includes a baler door), the control action(s) may include a movement action and/or a baling performance action. In response to determining the component of the agricultural system is in the target position, the method 76 returns to block 78.

Figure 4:
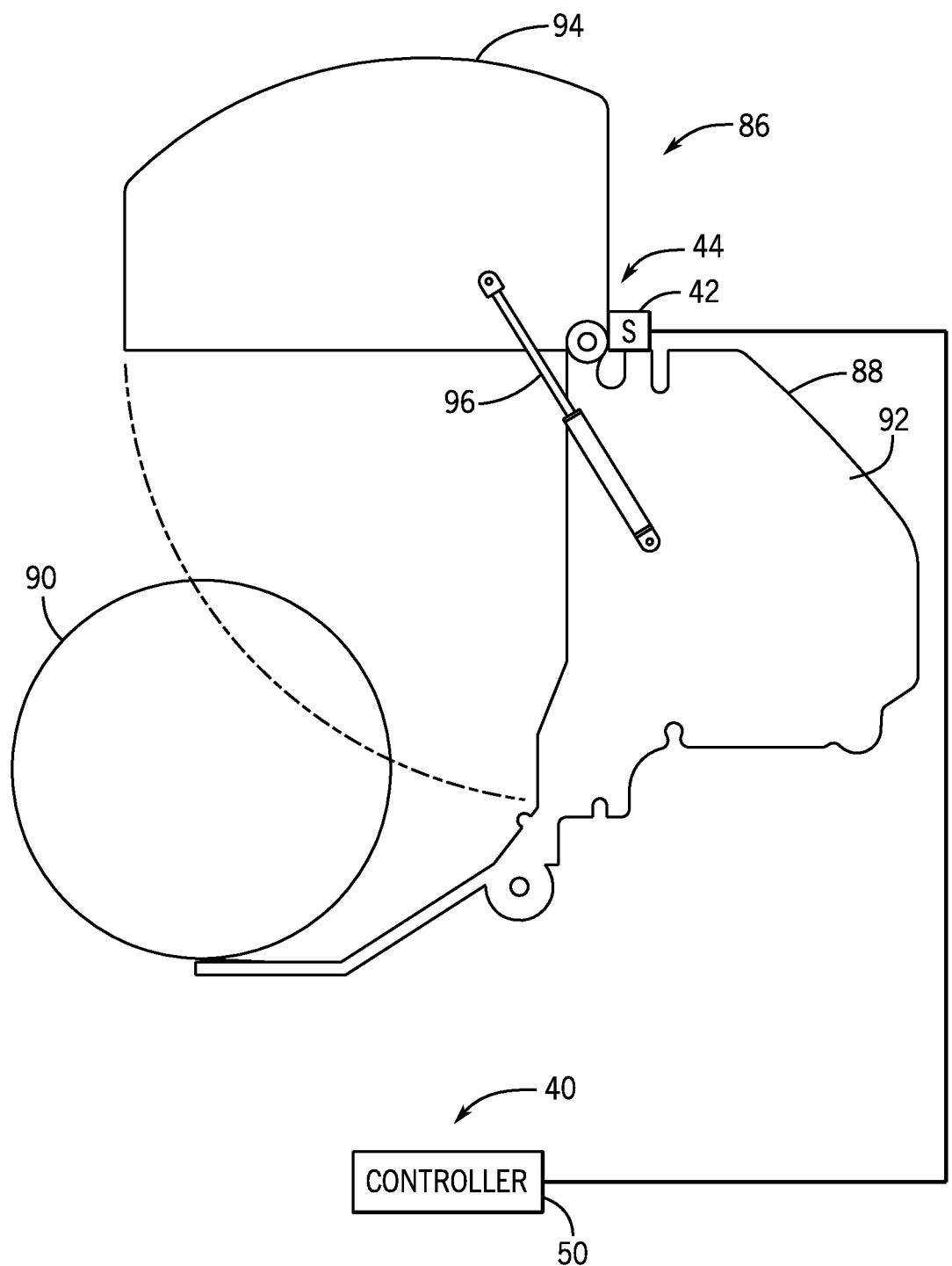
FIG. 4 is a side view of a portion of another embodiment of an agricultural system that may include the condition verification system of FIG. 2.

FIG. 4 is a side view of a portion of another embodiment of an agricultural system 86 that may include the condition verification system 40 of FIG. 2. In the illustrated embodiment, the agricultural system 86 includes a baler/baling implement 88. The baler/baling implement 88 is configured to form a bale 90 of agricultural product (e.g., cotton, straw, etc.). In the illustrated embodiment, the bale 90 is a round bale. However, in other embodiments, the baler/baling implement may be configured to form a square/rectangular bale. In the illustrated embodiment, the baler/baling implement 88 includes a body 92 and a door 94 movably coupled to the body 92. The door 94 is configured to open to facilitate discharge of the bale 90, and the door 94 is configured to close to facilitate formation of the bale 90. An actuator 96 is configured to drive the door 94 between the open position, as illustrated, and the closed position. In the illustrated embodiment, the door 94 is configured to rotate relative to the body 92 between the open and closed positions. However, in other embodiments, the door may be configured to translate or both rotate and translate relative to the body to transition the door between the open and closed positions.

As previously discussed, the perception sensor system 44 includes one or more sensors 42 configured to output sensor signal(s) indicative of positions of objects within the field(s) of view of the sensor(s) 42. In addition, the controller 50 of the position verification system 40 is configured to receive the sensor signal(s) from the sensor(s) 42, and the controller 50 is configured to control the speed control system of the agricultural system 86 and the steering control system of the agricultural system 86 based on the sensor signal(s) to direct the agricultural system 86 through a field (e.g., agricultural field). The controller 50 is also configured to determine whether component(s) of the agricultural system 86 are in target position(s) based on the sensor signal(s), and the controller 50 is configured to terminate or block initiation of at least one control action in response to determining the component(s) are not in the target position(s).

In the illustrated embodiment, the component(s) of the agricultural system 86 monitored by the sensor(s) 42 include the baler door 94, and the target position of the baler door 94 is the closed position. In addition, the control action(s) may include a movement action of the agricultural system and/or a baling performance action. Accordingly, in response to determining the baler door 94 is not in the closed position, the controller 50 may terminate or block initiation of the movement action and/or the baling performance action. The movement action may be performed by the speed control system. Accordingly, the controller 50 may instruct the speed control system to terminate the movement action, or the controller 50 may block initiation of movement instructions to the speed control system. Furthermore, the baling performance action may include forming the bale within the baler/baling implement 88. Accordingly, terminating or blocking initiation of the baling performance action may include terminating bale formation or blocking initiation of bale formation. While the sensor(s) 42 configured to monitor the position of the baler door 94 are part of the perception sensor system 44 in the illustrated embodiment, in other embodiments, at least one sensor configured to monitor the position of the baler door (e.g., each sensor configured to monitor the position of the baler door, etc.) may be separate from/independent of the perception sensor system.

While determining whether a component of the agricultural system is in a target position and terminating or blocking initiation of at least one control action in response to determining the component is not in the target position is disclosed above, in certain embodiments, the controller may determine whether a component of the agricultural system is in a target state and terminate or block initiation of at least one control action in response to determining the component is not in the target state. For example, in certain embodiments, the agricultural system may include a differential locking system, and the target state may be an unlocked state. In such embodiments, the controller may terminate or block initiation of at least one control action in response to determining the differential locking system is not in the unlocked state. For example, the at least one control action may include a headland turn action.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A condition verification system for an agricultural system, comprising:
   a sensor configured to output a sensor signal indicative of a position of a ground engaging tool of the agricultural system relative to soil; and
   a controller comprising a memory and a processor, wherein the controller is communicatively coupled to the sensor, and the controller is configured to:
   receive the sensor signal from the sensor;
   determine whether the ground engaging tool is engaged with the soil based on the position of the ground engaging tool; and
   terminate or block initiation of at least one control action of a speed control system of the agricultural system, a steering control system of the agricultural system, or a combination thereof, in response to determining the ground engaging tool is engaged with the soil.

2. The condition verification system of claim 1, wherein the sensor is part of a perception sensor system, and the controller is configured to control movement of the agricultural system through a field based on feedback from the sensor.

3. The condition verification system of claim 2, wherein the sensor comprises a LIDAR sensor, a RADAR sensor, a camera, or a combination thereof.

4. The condition verification system of claim 1, wherein the sensor is configured to monitor a hitch position of a hitch.

5. The condition verification system of claim 1, wherein the speed control system is configured to perform a rearward movement action, and the at least one control action comprises the rearward movement action.

6. The condition verification system of claim 1, wherein the speed control system is configured to perform a parking brake engagement action, and the at least one control action comprises the parking brake engagement action.

7. The condition verification system of claim 1, wherein the steering control system is configured to perform a headland turn action, and the at least one control action comprises the headland turn action.

8. A condition verification system for an agricultural system, comprising:
- a perception sensor system comprising a sensor configured to output a sensor signal indicative of positions of objects within a field of view of the sensor; and
- a controller comprising a memory and a processor, wherein the controller is communicatively coupled to the sensor, and the controller is configured to:
  - receive the sensor signal from the sensor;
  - detect an obstacle within a field based on the sensor signal;
  - control a speed control system of the agricultural system to stop the agricultural system before encountering the obstacle, control a steering control system of the agricultural system to direct the agricultural system around the obstacle, or a combination thereof;
  - determine whether a component of the agricultural system is in a target position based on the sensor signal; and
  - terminate or block initiation of at least one control action in response to determining the component is not in the target position.

9. The condition verification system of claim 8, wherein the sensor comprises a LIDAR sensor, a RADAR sensor, a camera, or a combination thereof.

10. The condition verification system of claim 8, wherein the component comprises a ground engaging tool of the agricultural system, and the target position comprises a ground-disengaged position.

11. The condition verification system of claim 10, wherein the at least one control action comprises a rearward movement action, a parking brake engagement action, a headland turn action, or a combination thereof.

12. The condition verification system of claim 10, wherein the sensor is configured to monitor a hitch position of a hitch to enable the controller to determine whether the ground engaging tool is in the ground-disengaged position.

13. The condition verification system of claim 8, wherein the component comprises a baler door, and the target position comprises a closed position.

14. The condition verification system of claim 13, wherein the at least one control action comprises a movement action, a baling performance action, or a combination thereof.

15. A condition verification system for an agricultural system, comprising:
- a perception sensor system comprising a sensor configured to output a sensor signal indicative of positions of objects within a field of view of the sensor; and
- a controller comprising a memory and a processor, wherein the controller is communicatively coupled to the sensor, and the controller is configured to:
  - receive the sensor signal from the sensor;
  - control a speed control system of the agricultural system and a steering control system of the agricultural system based on the sensor signal to direct the agricultural system through a field;
  - determine whether a ground engaging tool of the agricultural system is engaged with soil based on the sensor signal; and
  - terminate or block initiation of at least one control action of the speed control system, the steering control system, or a combination thereof, in response to determining the ground engaging tool is engaged with the soil.

16. The condition verification system of claim 15, comprising a user interface, wherein the controller is configured to output an information signal to the user interface indicative of the ground engaging tool being engaged with the soil in response to determining the ground engaging tool is engaged with the soil, and the user interface is configured to inform an operator that the ground engaging tool is engaged with the soil in response to receiving the information signal.

17. The condition verification system of claim 15, wherein the sensor comprises a LIDAR sensor, a RADAR sensor, a camera, or a combination thereof.

18. The condition verification system of claim 15, wherein the speed control system is configured to perform a rearward movement action, and the at least one control action comprises the rearward movement action.

19. The condition verification system of claim 15, wherein the speed control system is configured to perform a parking brake engagement action, and the at least one control action comprises the parking brake engagement action.

20. The condition verification system of claim 15, wherein the steering control system is configured to perform a headland turn action, and the at least one control action comprises the headland turn action.

* * * * *